(12) United States Patent
Saito et al.

(10) Patent No.: US 11,386,150 B2
(45) Date of Patent: Jul. 12, 2022

(54) DISPLAY CONTROL SYSTEM AND DISPLAY CONTROL METHOD

(71) Applicant: COTODAMA INC., Tokyo (JP)

(72) Inventors: Jin Saito, Tokyo (JP); Kohei Numata, Tokyo (JP)

(73) Assignee: COTODAMA INC., Tokyo (JP)

( * ) Notice: Subject to any disclaimer, the term of this patent is extended or adjusted under 35 U.S.C. 154(b) by 428 days.

(21) Appl. No.: 16/484,240

(22) PCT Filed: Feb. 6, 2018

(86) PCT No.: PCT/JP2018/004048
§ 371 (c)(1),
(2) Date: Aug. 7, 2019

(87) PCT Pub. No.: WO2018/147286
PCT Pub. Date: Aug. 16, 2018

(65) Prior Publication Data
US 2020/0034386 A1    Jan. 30, 2020

(30) Foreign Application Priority Data

Feb. 7, 2017   (JP) .............................. JP2017-020337

(51) Int. Cl.
*G06F 16/683* (2019.01)
*G06F 3/16* (2006.01)
*G10H 1/36* (2006.01)

(52) U.S. Cl.
CPC .............. *G06F 16/685* (2019.01); *G06F 3/16* (2013.01); *G10H 1/368* (2013.01); *G10H 2210/061* (2013.01); *G10H 2220/011* (2013.01)

(58) Field of Classification Search
CPC ......... G06F 16/685; G06F 3/16; G10H 1/368; G10H 2210/061; G10H 2220/011
See application file for complete search history.

(56) References Cited

U.S. PATENT DOCUMENTS

| | | | |
|---|---|---|---|
| 5,465,240 A | * | 11/1995 | Mankovitz ........... G11B 27/102 |
| 2003/0200452 A1 | * | 10/2003 | Tagawa .............. G11B 20/0021 713/193 |

(Continued)

FOREIGN PATENT DOCUMENTS

| EP | 2251871 A1 | 11/2010 |
|---|---|---|
| JP | 2004354423 A | 12/2004 |

(Continued)

OTHER PUBLICATIONS

Notification of Transmittal of Translation of the International Preliminary Report on Patentability (Form PCT/IB/338), International Preliminary Report on Patentability under Chapter I PCT (Form PCT/IB/373), and Translation of Written Opinion of the International Searching Authority (Form PCT/ISA/237) for International Application No. PCT/JP2018/004048, dated Aug. 22, 2019, 10 pages.

(Continued)

*Primary Examiner* — Fan S Tsang
*Assistant Examiner* — David Siegel
(74) *Attorney, Agent, or Firm* — Withrow & Terranova, P.L.L.C; Vincent K. Gustafson

(57) ABSTRACT

A method according to one aspect of the present disclosure includes acquiring verbal data representing a verbal expression corresponding to a sound reproduced by an acoustic device, and displaying, on a display device, motion graphics including the verbal expression corresponding to the sound reproduced by the acoustic device in a form of a text in accordance with the verbal data. The displaying the motion graphics on the display device includes selecting a type of motion graphics that relates to the verbal expression corresponding to the reproduced sound from among various types of motion graphics and displaying the selected type of motion graphics on the display device.

20 Claims, 14 Drawing Sheets

(56) References Cited

U.S. PATENT DOCUMENTS

2010/0293464 A1* 11/2010 Harada ................. G10H 1/361
                                                        715/716
2012/0259634 A1    10/2012 Tsunokawa
2018/0047374 A1     2/2018 Numata et al.

FOREIGN PATENT DOCUMENTS

| JP | 2007248916 A | * | 9/2007 | | |
|---|---|---|---|---|---|
| JP | 2010165160 A | | 7/2010 | | |
| JP | 4545106 B2 | * | 9/2010 | ........... | G06F 16/685 |
| JP | 2012220582 A | | 11/2012 | | |
| JP | 2016180835 A | | 10/2016 | | |
| WO | 2016143907 A1 | | 9/2016 | | |

OTHER PUBLICATIONS

Extended European Search Report for European Patent Application No. 18751336.1, dated Sep. 21, 2020, 12 pages.
Notice of Reasons for Refusal for Japanese Patent Application No. 2017-020337, dated Mar. 2, 2021, 9 pages.
Written Opinion of the International Searching Authority (Form PCT/ISA/237 and Translation of Form PCT/ISA/237) for International Application No. PCT/JP2018/004048, dated May 1, 2018, 4 pages.
International Search Report (Form PCT/ISA/210 and Translation of Form PCT/ISA/210) for International Application No. PCT/JP2018/004048, dated May 1, 2018, 4 pages.

\* cited by examiner

DISPLAY CONTROL SYSTEM AND DISPLAY CONTROL METHOD

CROSS-REFERENCE TO RELATED APPLICATION(S)

This application is a 35 U.S.C. § 371 national phase filing of International Application No. PCT/JP2018/004048 filed on Feb. 6, 2019 and claims the benefit of Japanese Patent Application No. 2017-020337 filed on Feb. 7, 2017 with the Japan Patent Office, wherein the entire disclosures of the foregoing applications are hereby incorporated by reference herein.

TECHNICAL FIELD

The present disclosure relates to a display control system and a display control method.

BACKGROUND ART

Music reproduction systems that display motion graphics in harmony with reproduction of musical pieces are already known. The applicant has already disclosed a system configured to display lyrics on a display device in motion graphics that fit the genre of musical pieces (for example, see Patent Document 1).

PRIOR ART DOCUMENTS

Patent Documents

Patent Document 1: International Patent Application Publication No. 2016/143907

SUMMARY OF THE INVENTION

Problems to be Solved by the Invention

There is room for improvement in the technique of displaying motion graphics, so that motion graphics displayed on a display device fit an image of a reproduced sound. Desirably, one aspect of the present disclosure can provide a new system and method for displaying, on a display device, appropriate motion graphics that fit an image of a reproduced sound.

Means for Solving the Problems

A display control system in one aspect of the present disclosure comprises an acquirer configured to acquire verbal data representing a verbal expression corresponding to a sound reproduced by an acoustic device, and a display controller configured to display, on a display device, motion graphics that include the verbal expression corresponding to the sound reproduced by the acoustic device in a form of a text in accordance with the verbal data.

A display controller is configured to select a type of motion graphics that relates to the verbal expression corresponding to the reproduced sound from among various types of motion graphics and display the selected type of motion graphics on the display device as motion graphics that include the verbal expression in a form of a text. This display control system can use the motion graphics that fit impressions listeners receive from the reproduced sound to display the verbal expression corresponding to the impressions on the display device.

The sound reproduced by the acoustic device may be a musical piece. In this case, the acquirer may be configured to acquire lyrics data of a musical piece reproduced by the acoustic device as verbal data. The display controller may be configured to select a type of motion graphics that fits the lyrics of the reproduced musical piece from among the various types of motion graphics and display the selected type of motion graphics, which include the lyrics of the musical piece in a form of a text, on the display device in harmony with progression of the musical piece reproduced by the acoustic device. This display control system can use the motion graphics that fit impressions of the lyrics sang in the musical piece to display the lyrics on the display device in harmony with the reproduction of the musical piece.

In one aspect of the present disclosure, the display controller may be configured to analyze the lyrics data, select a type of motion graphics that fits the meaning of the lyrics of the reproduced musical piece from among various types of motion graphics, and display the selected type of motion graphics on the display device.

In one aspect of the present disclosure, the aforementioned various types of motion graphics may each include ornamental motion graphics configured to ornament the lyrics. In this case, the selection of a type of motion graphics that fits the meaning of the lyrics may include selection of the ornamental motion graphics that fit the meaning of the lyrics. The ornamental motion graphics may be those displayed as a background image of the lyrics.

In one aspect of the present disclosure, the aforementioned various types of motion graphics may each correspond to one or more words. The display controller may be configured to select a type of motion graphics that corresponds to a word included in the lyrics of the musical piece from among the various types of motion graphics.

In one aspect of the present disclosure, the display controller may be configured to input, at least partly, the lyrics of the musical piece to a classifier which is pre-trained by machine learning, and acquire from the classifier classification information of the meaning of the lyrics corresponding to the input as an output of the classifier. The display controller may be configured to select a type of motion graphics that fits the meaning of the lyrics of the reproduced musical piece from among the various types of the motion graphics in accordance with the acquired classification information.

In one aspect of the present disclosure, the display controller may be configured to select, for each of sections defined by dividing an entire lyrics of the musical piece, a type of motion graphics that fits the meaning of the lyrics in each section from among the various types of motion graphics. The selection of the motion graphics for each section enables the motion graphics to be displayed along with the story in the lyrics when the musical piece is reproduced.

In one aspect of the present disclosure, the display controller may be configured to determine a discrepancy between a reproduction length of the musical piece identified based on the lyrics data and a reproduction length of the musical piece determined based on the musical piece data used for reproducing the musical piece and select a type of motion graphics that fits the meaning of the lyrics from among the various types of motion graphics, so that a type of motion graphics having moderate changes is selected when the discrepancy is greater than a standard compared to when the discrepancy is less than a standard. By displaying the motion graphics having moderate changes on the display device, there may be reduced possibility of giving a user an impression that the reproduction of the musical piece and the display of the motion graphics are not in harmony with each other.

In one aspect of the present disclosure, the display controller may be configured to select a type of motion graphics that fits a language of the lyrics of the reproduced musical piece from among the various types of motion graphics and display the selected type of motion graphics on the display device.

Differences in the language of the lyrics affect the number of texts in the lyrics and display speed of the lyrics. The language of the lyrics may affect an impression the user feel for the musical piece. Selection of the motion graphics according to the language of the lyrics is therefore helpful for displaying the motion graphics that fit the impression of the musical piece.

In one aspect of the present disclosure, the display controller may be configured to select a type of motion graphics that fits a time of release of the reproduced musical piece from among the various types of motion graphics and display the selected type of motion graphics on the display device.

The user has different impressions on old-time released musical pieces and on newly released musical pieces. Selection of the motion graphics according to the time of release is therefore helpful for displaying the motion graphics that fit the impression of the musical piece.

In one aspect of the present disclosure, a display control method corresponding to the aforementioned display control system may be provided. This display control method may be performed by one or more computers and/or one or more processors.

In one aspect of the present disclosure, a display control method may be provided that comprises acquiring verbal data representing a verbal expression corresponding to a sound reproduced by an acoustic device, and displaying, on a display device, motion graphics including the verbal expression corresponding to the sound reproduced by the acoustic device in a form of a text in accordance with the verbal data.

Displaying the motion graphics on the display device may include selecting a type of motion graphics that relates to the verbal expression corresponding to the reproduced sound from among the various types of motion graphics and displaying the selected type of motion graphics on the display device as motion graphics that include the aforementioned verbal expression in a form of a text.

In one aspect of the present disclosure, the sound reproduced by the acoustic device may be a musical piece. The acquiring may include acquiring lyrics data of the musical piece reproduced by the acoustic device as the verbal data. The displaying of the motion graphics on the display device may include selecting a type of motion graphics that fits lyrics of the reproduced musical piece from among the various types of motion graphics and displaying the selected type of motion graphics, which include the lyrics of the musical piece in a form of a text, on the display device in harmony with progression of the musical piece reproduced by the acoustic device.

In one aspect of the present disclosure, the displaying of the motion graphics on the display device may include analyzing the lyrics data, selecting a type of motion graphics that fits the meaning of the lyrics of the reproduced musical piece from among the various types of motion graphics, and displaying the selected type of motion graphics on the display device.

The displaying of the motion graphics on the display device may include selecting a type of motion graphics that fits the language of the lyrics of the reproduced musical piece from among the various types of motion graphics and displaying the selected type of motion graphics on the display device.

The displaying of the motion graphics on the display device may also include selecting a type of motion graphics that fits the time of release of the reproduced musical piece from among the various types of motion graphics and displaying the selected type of motion graphics on the display device.

In one aspect of the present disclosure, a computer program configured to include instructions to have a computer perform the aforementioned display control method may be provided. In one aspect of the present disclosure, as at least one of the acquirer or the display controller, a computer program configured to include instructions to function a computer in the display control system may be provided. In addition, a non-transitory computer-readable substantive memory that stores these computer programs may be provided.

EXPLANATION OF REFERENCE NUMERALS

1, 3, 4 . . . music reproduction system, 10 . . . portable communication terminal, 11 . . . control unit, 11A . . . CPU, 11B . . . RAM, 13 . . . storage unit, 15 . . . user interface, 17 . . . communication unit, 50 . . . acoustic reproduction device, 51 . . . control unit, 51A . . . CPU, 51B . . . RAM, 53 . . . storage unit, 54 . . . speaker, 55 . . . display, 57 . . . communication unit, 70, 90, 95 . . . server device, 111 . . . main controller, 113 . . . first transmission controller, 115 . . . second transmission controller, 511, 611, 711 . . . reproduction planning unit, 513 . . . reproduction controller, 515 . . . display controller, 951 . . . classifier, D1 . . . musical piece data, D2, D31, D32 . . . motion graphics data, D21 . . . component data, D211 . . . text motion defining data, D212 . . . background motion defining data, D22 . . . conditions data, DL . . . lyrics data, SR . . . reproduction signal, SP . . . reproduction position signal, TC . . . time code.

MODE FOR CARRYING OUT THE INVENTION

Hereinafter, example embodiments of the present disclosure will be explained with reference to the drawings.

Figure 1:
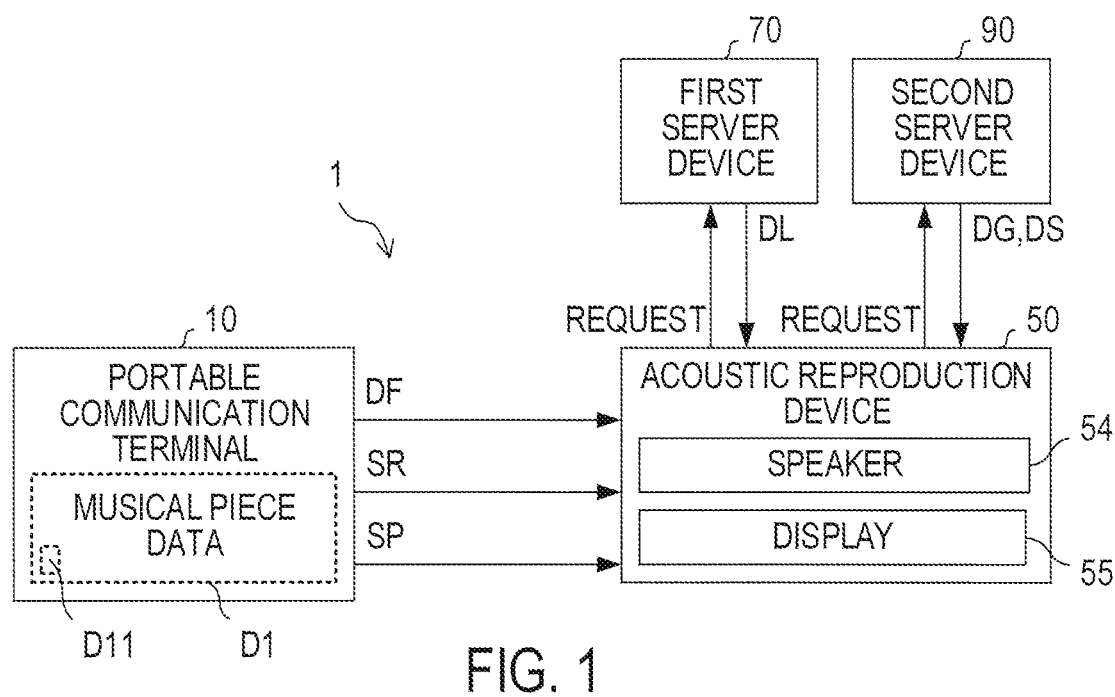
FIG. 1 is a block diagram showing a schematic configuration of a music reproduction system.

As shown in FIG. 1, a music reproduction system 1 of the present embodiment comprises a portable communication terminal 10, an acoustic reproduction device 50, a first server device 70, and a second server device 90. The portable communication terminal 10 may be, for example, a smartphone or a tablet.

In the music reproduction system 1, the portable communication terminal 10 performs reproduction processing of musical piece data D1 and transmits a reproduction signal SR and a reproduction position signal SP of the musical piece data D1 to the acoustic reproduction device 50. Prior to the reproduction processing, the portable communication terminal 10 transmits music information data DF, which includes information that allows identification of a reproduced musical piece in accordance with the musical piece data D1 to the acoustic reproduction device 50.

The acoustic reproduction device 50 acquires lyrics data DL, which corresponds to the musical piece data D1 undergoing the reproduction processing, from the first server device 70 in accordance with the music information data DF received from the portable communication terminal 10, and acquires music genre data DG representing the genre of the corresponding musical piece and music structure data DS representing the music structure of the musical piece from the second server device 90. It should be understood that the genre of the musical piece discussed herein (hereinafter, referred to as music genre) is a classification of musical pieces as in a pop, rock, reggae and so on, and is not a classification in accordance with the meaning of the lyrics.

The acoustic reproduction device 50 outputs the corresponding musical piece from a speaker 54 in accordance with the reproduction signal SR received from the portable communication terminal 10 and displays motion graphics on a display 55 in harmony with the reproduction of the musical piece in accordance with the reproduction position signal SP received from the portable communication terminal 10. The motion graphics include lyrics. The acoustic reproduction device 50 determines a form of display of the motion graphics in accordance with the lyrics data DL acquired from the first server device 70 and the music genre data DG and the music structure data DS acquired from the second server device 90.

Communication between the portable communication terminal 10 and the acoustic reproduction device 50 is established through at least one of short-distance wireless communications as typified by Bluetooth (registered trademark) or wireless LAN communications. Communications between the acoustic reproduction device 50 and the first server device 70 and the second server device 90 is established through a wide area network. The wide area network is, for example, the Internet.

Figure 2:
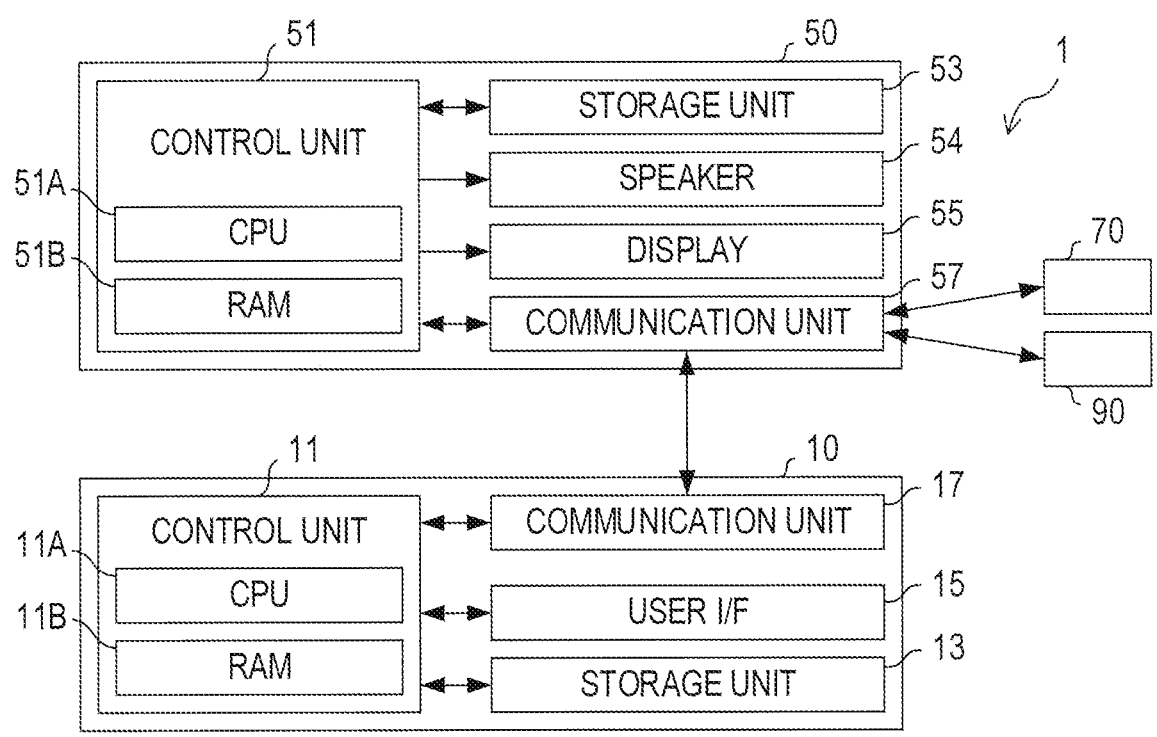
FIG. 2 is a block diagram showing a schematic configuration of a portable communication terminal and an acoustic reproduction device.

As shown in FIG. 2, the portable communication terminal 10 comprises a control unit 11, a storage unit 13, a user interface 15, and a communication unit 17. The control unit 11 comprises a CPU 11A and a RAM 11B. The CPU 11A performs a process in accordance with a computer program stored in the storage unit 13. The RAM 11B is used as a work area when the CPU 11A performs the process. Hereinafter, the process that the CPU 11A performs in accordance with the computer program will be explained as a process performed by a portable communication terminal 10 or the control unit 11.

The storage unit 13 stores various computer programs and data. The data stored by the storage unit 13 includes one or more sets of the musical piece data D1. The storage unit 13 comprises, for example, a flash memory.

The user interface 15 comprises a display and a touch panel. The user interface 15 is controlled by the control unit 11, displays various screens on the display, and inputs operation signals from the user through the touch panel to the control unit 11. The communication unit 17 is configured to allow short-distance wireless communications and wireless LAN communications. The control unit 11 wirelessly communicates with the acoustic reproduction device 50 via the communication unit 17.

The acoustic reproduction device 50 comprises a control unit 51, a storage unit 53, the speaker 54, the display 55, and a communication unit 57. The control unit 51 comprises a CPU 51A and a RAM 51B. The CPU 51A performs a process in accordance with various computer programs. The RAM 51B is used as a work area when the CPU 51A performs the process. Hereinafter, the process that the CPU 51A performs in accordance with the computer programs will be explained as a process performed by the acoustic reproduction device 50 or the control unit 51.

The storage unit 53 stores various computer programs and data. The data stored in the storage unit 53 includes motion graphics data D2 for each music genre (see FIG. 4). The acoustic reproduction device 50 may be configured to be able to acquire the motion graphics data D2 from an external server device through the wide area network.

The speaker 54 comprises speaker units and amplifiers for different ranges and converts an audio signal received from the control unit 51 to a sound and outputs the sound. The display 55 comprises, for example, a liquid crystal display. The display 55 is controlled by the control unit 51, and displays the motion graphics including the lyrics during the reproduction of the musical piece. The motion graphics displayed on the display 55 include changes in a text image and changes in a background image. The background image is in the background of the text image and ornaments the text image.

Similarly to the portable communication terminal 10, the communication unit 57 is configured to enable short-distance wireless communications and wireless LAN communications. The control unit 51 establishes short-distance communication or wireless LAN communication with the portable communication terminal 10 through the communication unit 57. The control unit 51 communicates with the first server device 70 and the second server device 90 arranged in the wide area network through the communication unit 57.

Figure 3:
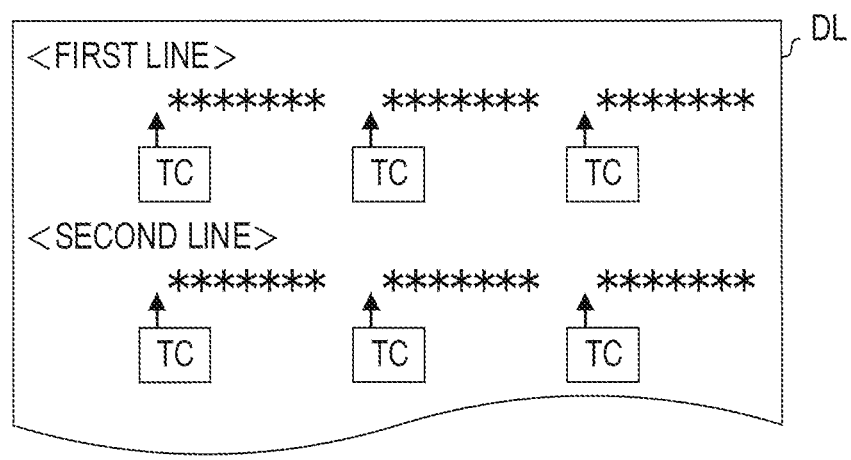
FIG. 3 is a diagram showing a configuration of lyrics data.

In accordance with a request signal from the acoustic reproduction device 50, the first server device 70 is configured to transmit the requested lyrics data DL to the acoustic reproduction device 50. The lyrics data DL is configured so that the lyrics of the musical piece are entered at least per each line. The lyrics data DL is configured to include various time codes TC embedded at various points throughout the entire lyrics of the musical piece in a specified entry method, each of the time codes TC represents a vocal start time at the embedded point. The time code TC corresponds to a reproduction position or a reproduction time of the embedded point when the beginning of the reproduced musical piece is the original point. FIG. 3 schematically shows a configuration of the lyrics data DL with the time codes TC embedded. In FIG. 3, the lyrics data DL includes the time code TC at the beginning of each line of the lyrics, and also at intermediate points in each line of the lyrics.

In accordance with the request signal from the acoustic reproduction device 50, the second server device 90 is configured to transmit the requested music genre data DG and music structure data DS of the musical piece to the acoustic reproduction device 50.

Known as the second server device 90 is a server device that automatically analyzes musical elements of the musical piece as it understands repeating structures and changes of tone of the musical piece and accumulates the music structure data DS acquired in accordance with the result of this analysis with the music genre data DG. For example, the music structure data DS of a pop music includes information that allows identification of sections of musical piece, such as "intro", "A-melody (verse)", "B-melody (pre-chorus)", "Sabi (chorus)", "C-melody (bridge)", "outro (ending)", and "bridge". Those "A-melody (verse)", "B-melody (pre-chorus)", "Sabi (chorus)", "C-melody (bridge)" are expressions used in the Japanese music market, and they respectively correspond to "verse", "pre-chorus", "chorus", and "bridge" as shown in the parentheses.

The music structure data DS includes information that allows identification of sections comprised in the musical piece, including a section bounded by a point where the tone of music changes, a section that shows repetitiveness, and a section that corresponds to a peak of the musical piece, such as Sabi (chorus).

Figure 4:
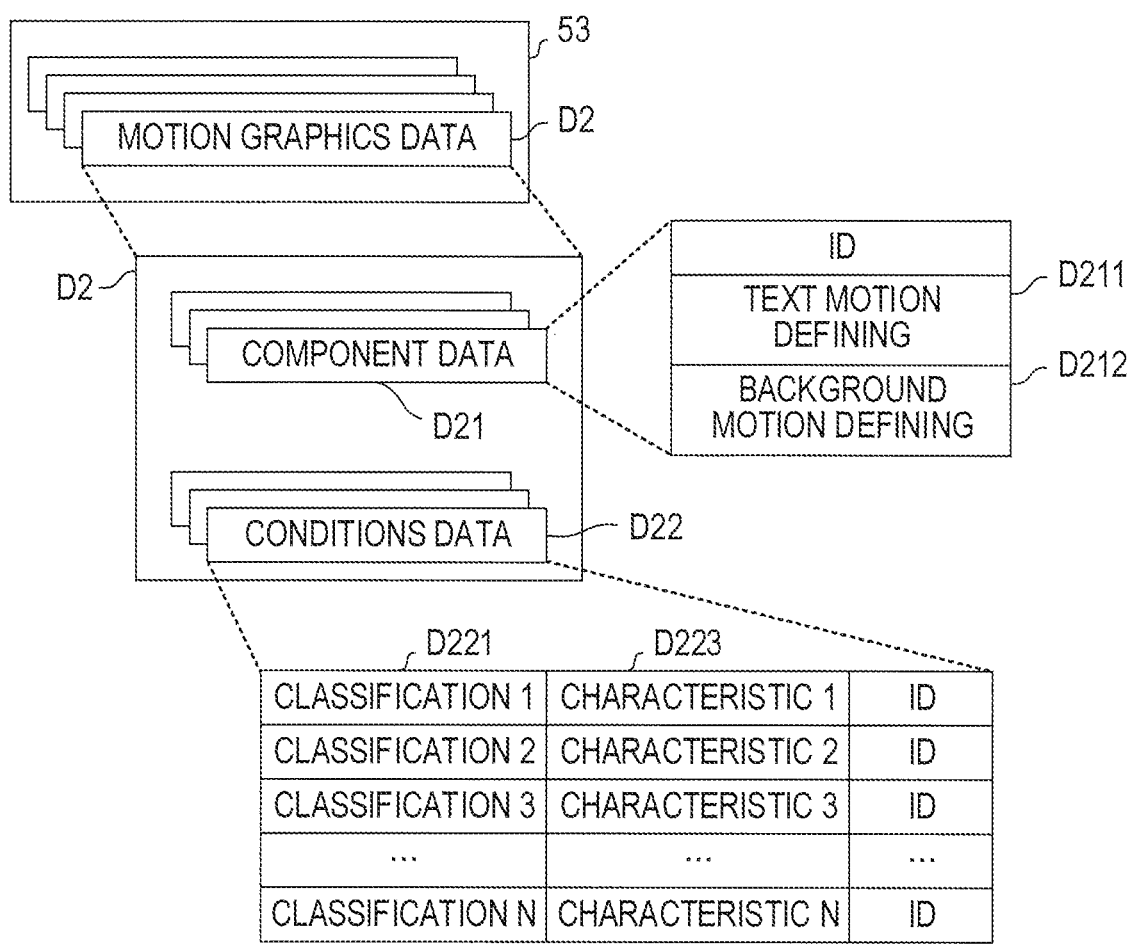
FIG. 4 is a diagram showing a configuration of motion graphics data.

With reference to FIG. 4, a configuration of the motion graphics data D2 stored in the storage unit 53 in the acoustic reproduction device 50 will be explained next. In the present embodiment, the storage unit 53 stores the motion graphics data D2 for each music genre. Each motion graphics data D2 defines the motion graphics for a text image and for a background image that should be displayed on the display 55 with the reproduction of the musical piece.

As shown in FIG. 4, the motion graphics data D2 includes two or more sets of component data D21, and conditions data D22 for each section. The two or more sets of the component data D21 are used alternatively. Each conditions data D22 defines the component data D21 that should be used in the corresponding section.

Each component data D21 includes, along with an identification code (ID) of the component data D21, text motion defining data D211 defining a motion of the text image (for example, lyrics) that should be displayed on the display 55 and background motion defining data D212 defining a motion of the background image that should be displayed on the display 55.

The text motion defining data D211 defines a font type, a font size, a movement pattern, and a movement speed of the text image. It should be understood that the text motion defining data D211 does not define the text. The text displayed in the motion graphics is the lyrics or something other than the lyrics that relates to the musical piece. The background motion defining data D212 defines a type, a movement pattern, and a movement speed of the background image.

It may be understood that a set of the component data D21 includes the component data D21 that only defines the motion graphics of the background image. In this case, the component data D21 may not include the text motion defining data D211, or, the component data D21 may formally include the text motion defining data D211 which may actually be an empty component data.

As shown in FIG. 4, each conditions data D22 defines the component data D21 that should be used in the corresponding section for each type of the meaning of the lyrics. Hereinafter, the type of the meaning of the lyrics will simply be referred to as a lyrics classification. As shown in the drawings, for each lyrics classification, the conditions data D22 includes characteristics data D223 representing the characteristics of the meaning of the lyrics, and the identification code (ID) of the component data D21 that should be used to display the motion graphics including the lyrics classified in this lyrics classification in association with a classification code D221 which is the identification code of the corresponding lyrics classification.

The characteristics data D223 can represent the characteristics of the meaning of the lyrics with a keyword group including one or more keywords. In this case, lyrics including one or more words that belong to the keyword group represented in the characteristics data D223 can be determined as belonging to the lyrics classification corresponding to this characteristics data D223. The characteristics data D223 may represent the characteristics of the meaning of the lyrics by keyword distributions. In this case, lyrics that include word distributions corresponding to the keyword distributions represented in the characteristics data D223 can be determined as belonging to the lyrics classification corresponding to this characteristics data D223.

It may be understood that the conditions data D22 includes information for defining the component data D21 that should be used when there are no lyrics. More specifically, the conditions data D22 may include the identification code of the component data D21 that should be used when there are no lyrics by associating with the classification code D221 for the lyrics classification of "no lyrics".

It may be understood that the conditions data D22 includes information for defining the component data D21 that should be used when the meaning of the lyrics is unknown, in other words, when an appropriate classification of the meaning of the lyrics is difficult. More specifically, the conditions data D22 may include the identification code of the component data D21 that should be used when the meaning of the lyrics is unknown by associating with the classification code D221 for the lyrics classification of "others".

Figure 5:
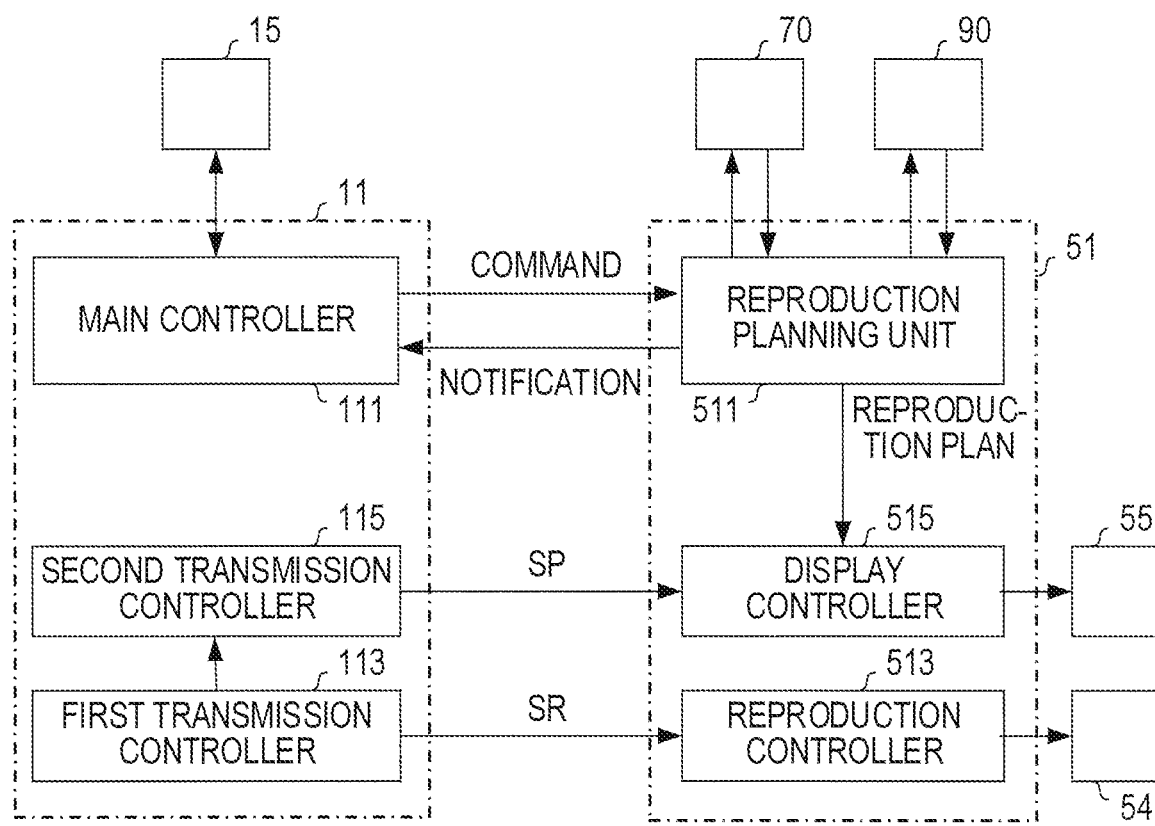
FIG. 5 is a block diagram showing a function realized in a control units in a portable communication terminal and an acoustic reproduction device.

With reference to FIG. 5, details of the functions realized in the control unit 11 of the portable communication terminal 10 and the control unit 51 of the acoustic reproduction device 50 will be explained next. The control unit 11 functions as a main controller 111, a first transmission controller 113, and a second transmission controller 115 by execution of a computer program.

When the user inputs a reproduction command designating one of the musical piece data D1 stored in the storage unit 13 through the user interface 15, the main controller 111 transmits to the reproduction device 50 via the communication unit 17 an operation command embedded with the music information data DF that corresponds to the musical piece data D1 designated by the reproduction command to be the subject of the reproduction processing.

The musical piece data D1 is configured so that metadata D11 is embedded in the musical piece data per se (see FIG. 1). The metadata D11 includes music information such as music name, music album name, and singer's name (artist name). The main controller 111 refers to the metadata D11 and transmits to the acoustic reproduction device 50 the operation command embedded with the music information data DF corresponding to the musical piece data D1 which is the subject of the reproduction processing. The music information data DF may include all or part of the music information included in the metadata D11. This music information data DF is used for the acoustic reproduction device 50 to acquire the lyrics data DL, the music genre data DG, and the music structure data DS corresponding to the musical piece data D1 which is the subject of the reproduction processing from the server devices 70, 90.

In response to receiving a preparation completion notice transmitted from the acoustic reproduction device 50 in response to this operation command, the main controller 111 commands the first transmission controller 113 and the second transmission controller 115 to initiate the processing.

In accordance with the aforementioned command to initiate the processing, the first transmission controller 113 transmits the reproduction signal SR of the musical piece data D1 to the acoustic reproduction device 50 through the communication unit 17 by performing the reproduction processing of the musical piece data D1. The reproduction processing performed by the first transmission controller 113 may be a processing to decode the musical piece data D1 into a form that the acoustic reproduction device 50 can output the musical piece from the speaker 54. In the present embodiment, a processing to realize streaming reproduction of the musical piece data D1 is performed by the first transmission controller 113 as the aforementioned reproduction processing.

In accordance with the aforementioned command to initiate the processing, the second transmission controller 115 transmits to the acoustic reproduction device 50 through the communication unit 17 the reproduction position signal SP that represents the reproduction position of the musical piece data D1, the reproduction processing of which is performed by the first transmission controller 113. The second transmission controller 115 may acquire information of the reproduction position controlled by the first transmission controller 113 from the first transmission controller 113 and transmit the reproduction position signal SP representing the reproduction position.

The control unit 51 of the acoustic reproduction device 50 functions as a reproduction planning unit 511, a reproduction controller 513, and a display controller 515 as a result of the execution of the computer program.

The reproduction planning unit 511 is configured to acquire the lyrics data DL from the first server device 70 and acquire the music genre data DG and the music structure data DS from the second server device 90 in response to the operation command from the portable communication terminal 10, and in accordance with these acquired data, create a reproduction plan for the motion graphics.

The reproduction plan created by the reproduction planning unit 511 is display control data for the motion graphics displayed on the display 55 in harmony with the reproduction of the musical piece from the beginning to the end of the musical piece. The reproduction plan specifically defines the motion graphics that should be displayed at each reproduction position of the musical piece identified by the reproduction position signal SP. The display controller 515 controls the display 55 in accordance with the reproduction plan and displays the motion graphics in accordance with the reproduction plan on the display 55. The reproduction plan may be written with control instructions that the display controller 515 can interpret.

Figure 6:
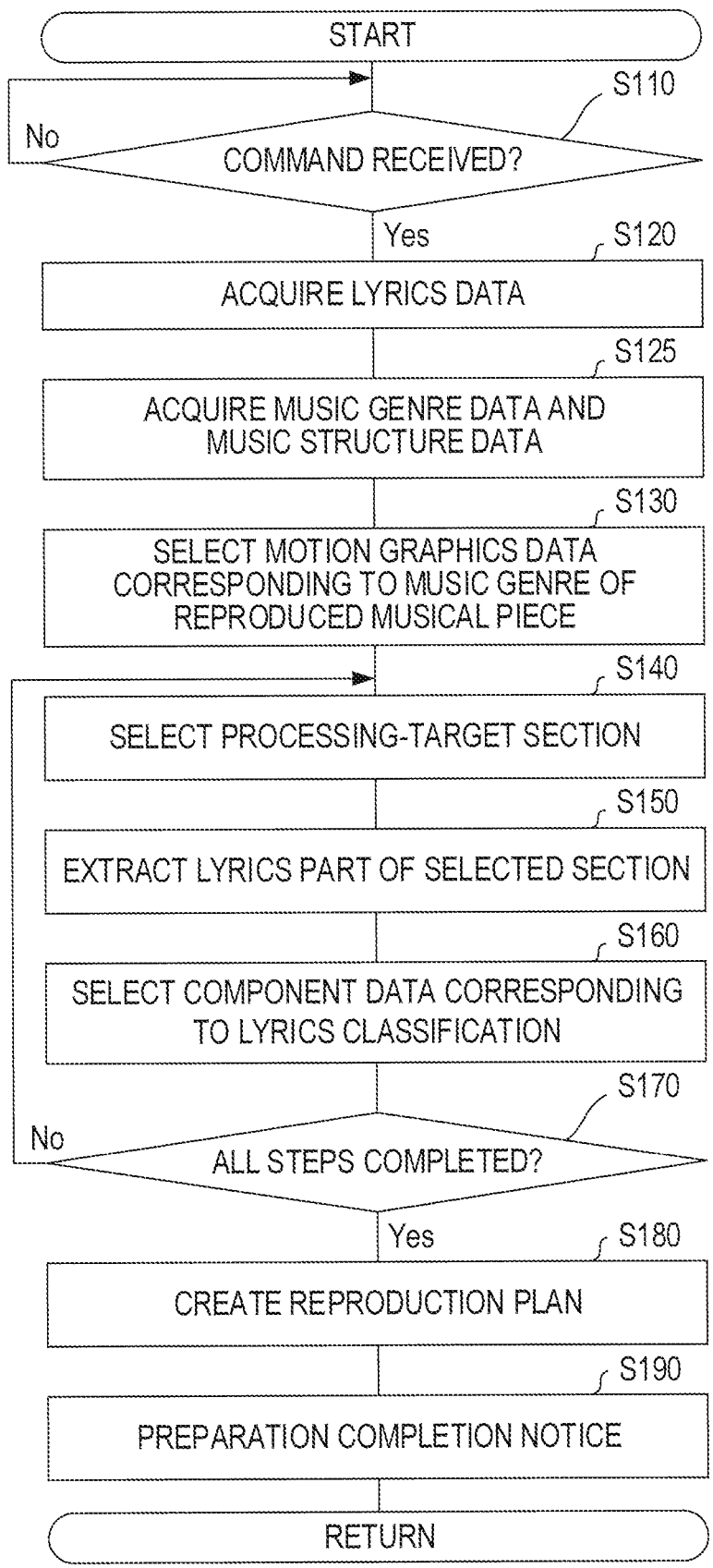
FIG. 6 is a flowchart showing a command receiving process performed by a reproduction planning unit.

The reproduction planning unit 511 is configured to repeatedly perform a command receiving process as shown in FIG. 6 for creating the reproduction plan. According to this command receiving process, the reproduction planning unit 511 waits until it receives the operation command transmitted from the portable communication terminal 10 via the communication unit 57 (S110).

In response to receiving the operation command (S110: Yes), the reproduction planning unit 511 acquires, from the first server device 70, the lyrics data DL corresponding to the musical piece data D1, of which the portable communication terminal 10 is going to perform the reproduction processing, in accordance with the music information data DF embedded in the operation command received from the portable communication terminal 10 (S120).

Moreover, the reproduction planning unit 511 acquires, from the second server device 90, the music genre data DG and the music structure data DS corresponding to the musical piece data D1, of which the portable communication terminal 10 is going to perform the reproduction processing, in accordance with the aforementioned music information data DF (S125).

Subsequently, the reproduction planning unit 511 refers to the acquired music genre data DG, determines the music genre of the musical piece to be reproduced, and selects the motion graphics data D2 of the music genre corresponding to the reproduced musical piece from among two or more sets of the motion graphics data D2 as reference motion graphics data D2 (S130).

Subsequent to the selection of the motion graphics data D2, the reproduction planning unit 511 refers to the conditions data D22 included in the reference motion graphics data D2 for each section of the musical piece identified by the acquired music structure data DS by repeatedly performing the process from S140 to S170, and selects the component data D21 used for displaying the motion graphics from among two or more sets of the component data D21 included in the reference motion graphics data D2. More specifically, for each section, the reproduction planning unit 511 selects the component data D21 of the lyrics classification corresponding to the meaning of the lyrics of the section as the component data D21 used for the section.

In S140, the reproduction planning unit 511 selects one of the sections included in the musical piece as a processing-target section. The reproduction planning unit 511 then extracts lyrics part of the processing-target section from the lyrics data DL (S150), analyzes the extracted lyrics part, and selects the component data D21 corresponding to the lyrics classification of the processing-target section as the component data D21 used in the processing-target section (S160).

For example, the reproduction planning unit 511 can analyze the extracted lyrics part and generate characteristic data representing the characteristics of the meaning of the lyrics. The processing of analyzing the lyrics part may be a processing to extract one or more keywords from the lyrics part. The characteristic data may be data to represent a list or distribution of the extracted keywords.

The reproduction planning unit 511 can compare the characteristic data generated from the lyrics part of the processing-target section to the characteristic data of each lyrics classification shown by the conditions data D22 of the processing-target section, determine the lyrics classification of the characteristic data with the best matching characteristics as the lyrics classification of the processing-target section, and select the component data D21 associated with the determined lyrics classification as the component data D21 to be used (S160).

For example, the reproduction planning unit 511 can determine the lyrics classification associated with the characteristics data D223 including the keywords extracted from the lyrics part of the processing-target section as the lyrics classification of the processing-target section. By allocating the keywords without overlapping between different lyrics classifications, it is possible to identify a single lyrics classification from the keywords extracted from the lyrics part of the processing-target section. Alternatively, the reproduction planning unit 511 can determine the lyrics classification associated with the characteristics data D223 including the keyword distribution consistent with the distribution of the keywords extracted from the lyrics part of the processing-target section as the lyrics classification of the processing-target section.

The reproduction planning unit 511 can select the component data D21 for the lyrics classification of "unknown" as the component data D21 to be used in the processing-target section when the lyrics classification of the processing-target section is unknown. The reproduction planning unit 511 can select the component data D21 for the lyrics classification of "no lyrics" when there are no lyrics in the processing-target section.

The reproduction planning unit 511 determines whether the processing from S150 to S160 has been performed for all the sections included in the musical piece (S170). If it is determined that the aforementioned processing has not been performed for all the sections (S170; No), the reproduction planning unit 511 proceeds the processing to S140 and selects one of the unprocessed sections as the processing-target section and performs the processing in and after S150. If it is determined that the aforementioned processing has been performed for all the sections (S170: Yes), the reproduction planning unit 511 proceeds the processing to S180.

In S180, in accordance with the lyrics data DL and the music structure data DS, and the component data D21 for each section selected in S160, the reproduction planning unit 511 creates the reproduction plan to display, on the display 55, the motion graphics of text image (lyrics) and background image at each reproduction position of the musical piece in accordance with the component data D21 corresponding to each reproduction position.

More specifically, the reproduction planning unit 511 creates the reproduction plan to cause the display controller 515 to control the display 55 in accordance with the reproduction position signal SP, so that the display 55 displays the motion graphics of the text image (lyrics) in accordance with the text motion defining data D211 included in the component data D21 of the corresponding section and the motion graphics of the background image in accordance with the background motion defining data D212 included in the same component data D21 in harmony with the progression of the musical piece (the changes in the reproduction position).

In this processing, the reproduction planning unit 511 creates the reproduction plan in accordance with the time code TC included in the lyrics data DL, so that the motion graphics of the corresponding lyrics part is displayed on the display 55 at each reproduction position of the musical piece corresponding to each time code TC.

Subsequent to thus creating the reproduction plan, the reproduction planning unit 511 proceeds the processing to S190 and transmits the preparation completion notice to the portable communication terminal 10. In response to receiving the preparation completion notice, the reproduction processing of the musical piece data D1 is initiated in the portable communication terminal 10, and the reproduction signal SR and the reproduction position signal SP are transmitted.

The reproduction controller 513 receives the reproduction signal SR from the portable communication terminal 10 via the communication unit 57 and realizes the reproduction of the musical piece through the speaker 54 by inputting an audio signal, which causes the speaker 54 to output a sound in accordance with the reproduction signal SR, to the speaker 54.

The display controller 515 receives the reproduction position signal SP from the portable communication terminal 10 via the communication unit 57 and controls the display 55 in accordance with the aforementioned reproduction plan, so that the motion graphics corresponding to the output sound from the speaker 54 is displayed on the display 55 in accordance with the reproduction position signal SP. The control unit 51 thus controls the display 55 to display the motion graphics of the text image and the background image, which include the text image of the lyrics and fit the meaning of the lyrics, in harmony with the progression of the reproduction of the musical piece on the display 55.

The motion graphics that fit the meaning of the lyrics may be the motion graphics corresponding to the feeling of a person and to circumstances and surroundings associated with the meaning of the lyrics. The impression the user receives of the motion graphics of the text image varies due to font types, font sizes, movements, position-change speeds, shape-change speeds, and the like. The font types include rounded font types giving a soft impression, edgy font types giving a hard impression, feminine font types, and masculine font types.

The motion graphics of the background image may be, for example, of a simple geometric figure. In this case, the impression the user receives of the motion graphics of the background image varies due to, for example, shapes of the geometric figure, sizes of the geometric figure, movements, position-change speeds, shape-change speeds and the like. From this perspective, the motion graphics data D2 may be generated manually, for example.

Figure 7:
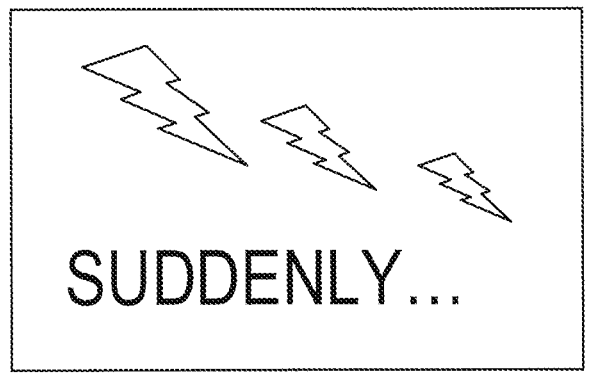
FIG. 7 is a diagram showing an example of motion graphics.

For example, in the reproduction positions of the musical piece with sorrowful lyrics, the motion graphics of the background image that portray or are associated with "tears", "rain", and the like may be displayed on the display 55. For example, in the reproduction positions of the musical piece with lyrics related to autumn, the motion graphics of the background image associated with fallen leaves may be displayed. In the reproduction positions of the musical piece with lyrics related to winter, the motion graphics of the background image associated with snow fall may be displayed. As shown in FIG. 7, in the reproduction positions of the musical piece with lyrics related to anger or shock, the motion graphics of the background image associated with a lightning strike may be displayed. In the reproduction positions of the musical piece with lyrics related to romance, the motion graphics of a heart-shaped background image may be displayed.

The motion graphics of the text image using a font that fits the impression of the aforementioned meanings of the lyrics may be displayed on the motion graphics of the background image that fit the impression of the aforementioned meanings of the lyrics. Differences in the speed and movement of the text image also give the user different impressions as mentioned above. Examples of the movement patterns include a curvy movement pattern as the text image is floating, and a linear movement pattern as if the text images shower down. The speed of the text image and the movement pattern of the text image of the motion graphics are also displayed in a form that fits the impression of the meaning of the lyrics. The motion graphics of the text image may include one or more displacement, rotation, and change in font size of the text image.

The configuration of the music reproduction system 1 of the present embodiment has been explained above. In this music reproduction system 1, the reproduction planning unit 511 acquires the lyrics data DL of the musical piece, which is reproduced through the speaker 54, from the first server device 70. The reproduction planning unit 511 also acquires, from the second server device 90, the music genre data DG and the music structure data DS of the reproduced musical piece and reads the motion graphics data D2 from the storage unit 53.

The reproduction planning unit 511 creates the reproduction plan for the motion graphics including the text image and the background image corresponding to the meaning of the lyrics of the musical piece in accordance with thus acquired lyrics data DL, music genre data DG, and music structure data DS of the reproduced musical piece. The display controller 515 controls the display 55 in harmony with the progression of the musical piece, that is in accordance with the reproduction position signal SP, so that the motion graphics in accordance with the reproduction plan is displayed on the display 55. The display controller 515 thereby displays the motion graphics including the lyrics of the musical piece on the display 55 in harmony with the progression of the musical piece.

Particularly, in the present embodiment, the reproduction planning unit 511 creates the reproduction plan by determining the component data D21 to use in accordance with the meaning of the lyrics of each section identified by the music structure data DS; and, in accordance with this reproduction plan, the display controller 515 displays, on the display 55, the motion graphics, which is in accordance with the structure of the reproduced musical piece and changes in meaning of the lyrics. Accordingly, the acoustic reproduction device 50 can display the motion graphics on the display 55 in harmony with the progression of the musical piece with enriched expression, which can be more entertaining for the user.

Modified examples will be explained next. The music reproduction system in the modified examples is different from the music reproduction system 1 of the aforementioned embodiment in partial configuration and partial processing. Thus, among the configurations and processings of the music reproduction system of the modified examples, those in common with the music reproduction system 1 of the aforementioned embodiment will be given the same reference numerals, and explanations of those configurations and processings will be omitted hereinafter.

First Modified Example

Figure 8:
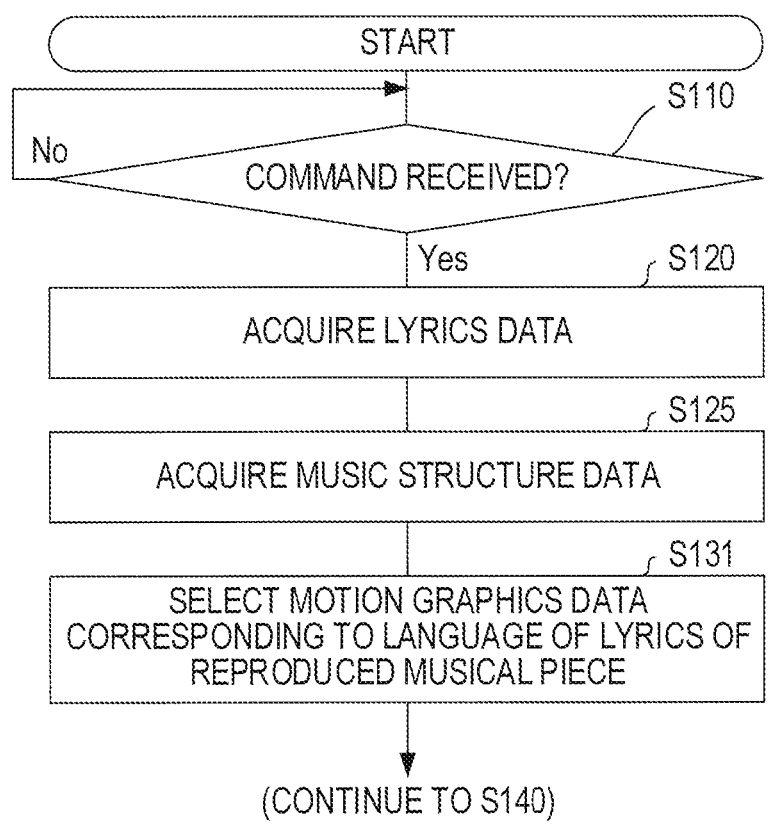
FIG. 8 is a flowchart showing a command receiving process in a first modified example.

As shown in FIG. 4, in the music reproduction system of the first modified example, the storage unit 53 comprises the motion graphics data D2 for each language of the lyrics in place of the motion graphics data D2 for each music genre; the reproduction planning unit 511 is configured to perform a command receiving process shown in FIG. 8 in place of the command receiving process shown in FIG. 6. More specifically, the reproduction planning unit 511 is configured to perform the processing in S131 in place of the processing in S130.

The command receiving process in the first modified example is the same as the command receiving process in the aforementioned embodiment as shown in FIG. 6 except for including the processing in S131 in place of the processing in S130. Similarly to the aforementioned embodiment, the reproduction planning unit 511 can perform the processings in and after S140 after performing the processing in S131 although it is not shown in FIG. 8.

In S131, the reproduction planning unit 511 determines the language of the lyrics of the reproduced musical piece with reference to the lyrics data DL. The reproduction planning unit 511 then selects the motion graphics data D2 corresponding to the determined language of the lyrics as reference motion graphics data D2. In the processings subsequent to S140, the reproduction planning unit 511 creates the reproduction plan by using this motion graphics data D2. The display controller 515 displays, on the display 55, the motion graphics of the text image (lyrics) and the background image that fit the language of the lyrics in accordance with the reproduction plan.

When creating the motion graphics data D2 for each language of the lyrics, a creator of the motion graphics data D2 can create the motion graphics data D2 for each language with considerations of differences in the number of letters in the lyrics and the speed of speeches between the languages, so as to define the motion graphics of the text image and the background image that fit the number of letters and the speed of speech.

For example, Japanese, which has a small number of letters in the lyrics and a low speed of speech due to the existence of Kanji, can make good use of the motion graphics that display the texts in the lyrics one by one. Contrarily, English, which has a larger number of letters in the lyrics than Japanese and a faster speed of speech than Japanese, cannot make good use of the motion graphics that display the texts in the lyrics one by one. In English, it is effective to display the lyrics word by word or by unit consisting more than a word, rather than displaying the texts in the lyrics one by one, to convey the meaning of the lyrics to the user. The creator of the motion graphics data D2 may define the motion graphics with considerations of differences in the direction of writing between the languages, so that the movement of the text image matches the direction of writing. Examples of the direction of writing explained herein include vertical direction (vertical writing) and transverse direction (transverse writing).

In the present modified example, the acoustic reproduction device 50 can change the motion graphics to be displayed to correspond to the language of the lyrics of the reproduced musical piece. Such display of the motion graphics corresponding to the language of the lyrics can be more entertaining for the user.

Second Modified Example

Figure 9:
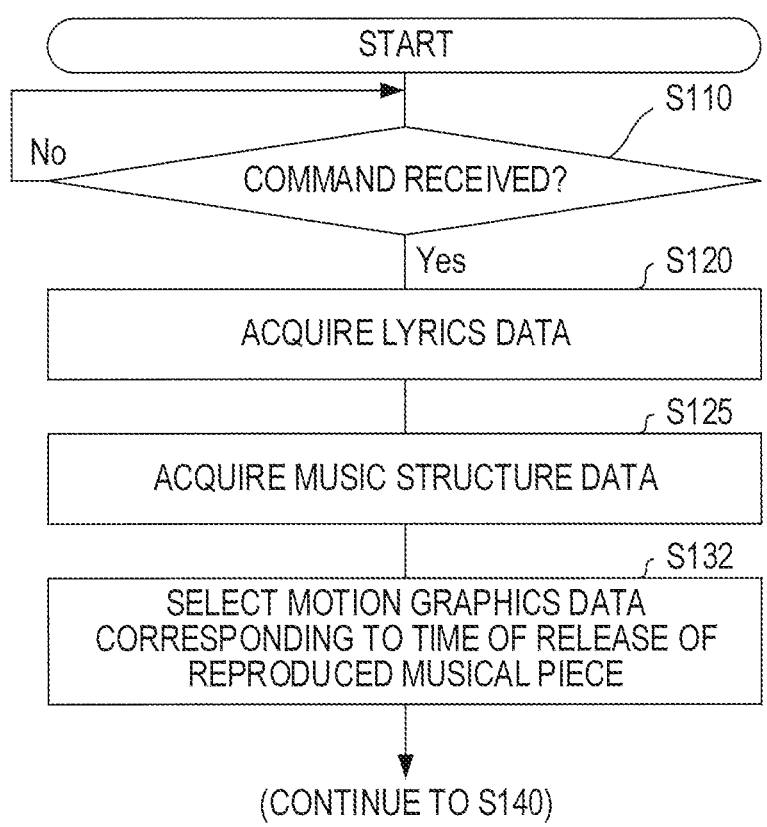
FIG. 9 is a flowchart showing a command receiving process in a second modified example.

In the music reproduction system of the second modified example, the storage unit 53 shown in FIG. 4 comprises the motion graphics data D2 for each time of release of the musical piece in place of the motion graphics data D2 for each music genre; and the reproduction planning unit 511 is configured to perform the command receiving process shown in FIG. 9 in place of the command receiving process shown in FIG. 6. More specifically, the reproduction planning unit 511 is configured to perform the processing in S132 in place of the processing in S130 and select the motion graphics data D2 corresponding to the time of release of the reproduced musical piece in as the reference.

The command receiving process in the second modified example is the same as the command receiving process in the aforementioned embodiment shown in FIG. 6 except for including the processing in S132 in place of the processing in S130. Similarly to the aforementioned embodiment, the reproduction planning unit 511 can perform the processings in and after S140 after performing the processing in S132 although it is not shown in FIG. 9.

In S132, the reproduction planning unit 511 determines the time of release of the reproduced musical piece. For example, the time of release is divided by decade. For example, the reproduction planning unit 511 can determine whether the time of release of the reproduced musical piece is before the 1960s, in the 1960s, in the seventies, in the eighties, in the nineties, in the 2000s, in the 2010s, or in the last one year. The information for determining the time of release may be included in the music information data DF or in the lyrics data DL.

In S132, the reproduction planning unit 511 selects the motion graphics data D2 corresponding to thus determined time of release as the reference motion graphics data D2. In the processings subsequent to S140, the reproduction planning unit 511 creates the reproduction plan by using the selected motion graphics data D2. The display controller 515 displays, on the display 55, the motion graphics of the text image (lyrics) and the background image that fit the time of release in accordance with the reproduction plan.

When creating the motion graphics data D2 for each time of release, the creator of the motion graphics data D2 can create the motion graphics data D2 for each time of release so as to define the motion graphics with considerations of impressions the user who listens to the musical piece usually have on the musical piece in the corresponding time of release.

For example, the motion graphics with fresh impression may be displayed on the display 55 for the musical piece with recent time of release; the motion graphics with old-fashioned impression may be displayed on the display 55 for the musical piece with old time of release. The old-fashioned impression can be conveyed to the user, for example, by expressing vertical lines and vagueness that appear on old film movies on the motion graphics of the text image and the background image. The fresh impression can be conveyed to the user, for example, by clearness and originalities in patterns of the motion graphics.

In the present embodiment, the acoustic reproduction device 50 can change the motion graphics to be displayed to correspond to the time of release of the reproduced musical piece. Such display of the motion graphics corresponding to oldness and newness of the reproduced musical piece can entertain the user.

Third Modified Example

Figure 10:
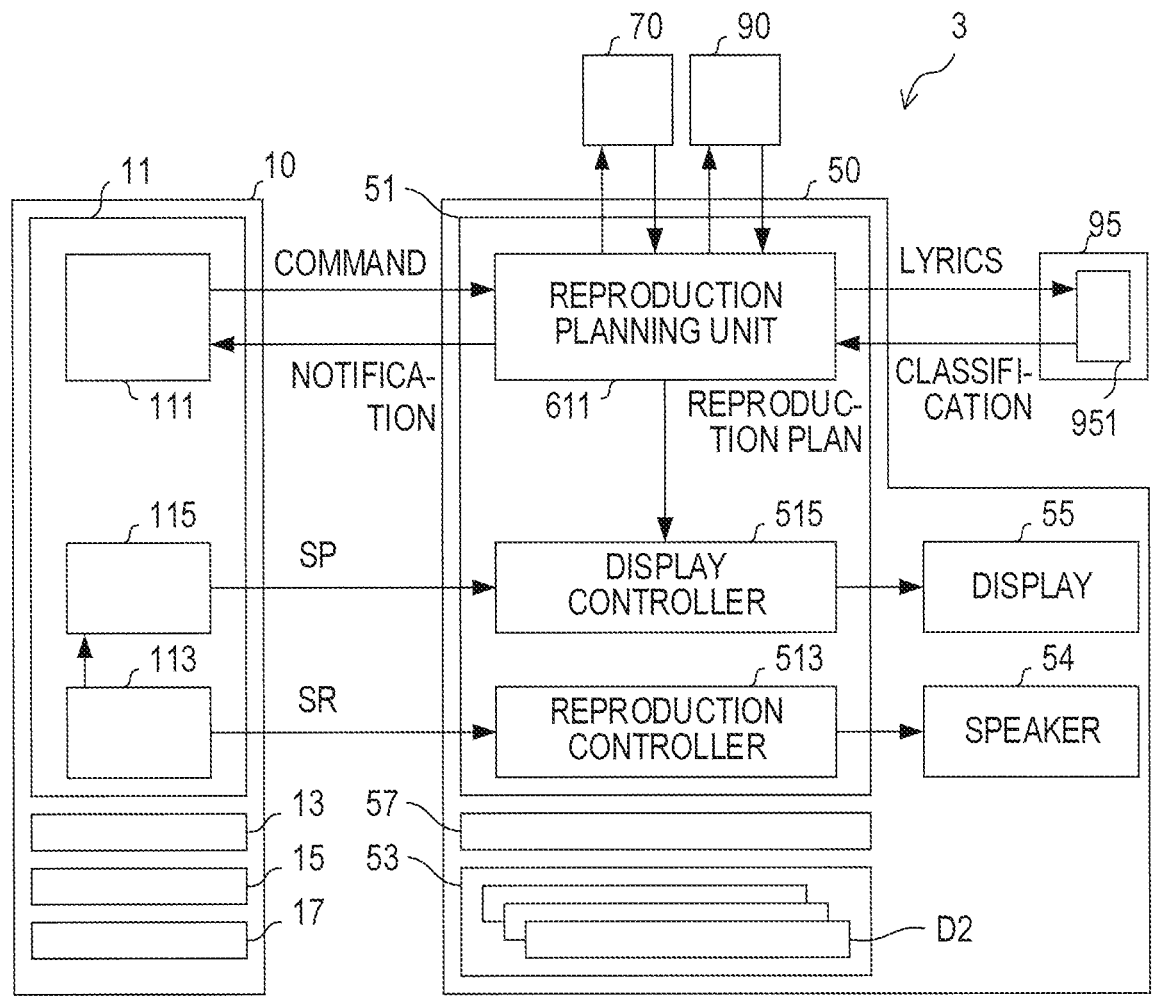
FIG. 10 is a block diagram showing a schematic configuration of a music reproduction system in a third modified example.

A music reproduction system 3 of the third modified example comprises a third server device 95 shown in FIG. 10 in addition to the portable communication terminal 10, the acoustic reproduction device 50, the first server device 70, and the second server device 90. A reproduction planning unit 611 in place of the reproduction planning unit 511 in the aforementioned embodiment is configured to communicate with the third server device 95 and query the third server device 95 for the lyrics classification of the processing-target section, and acquire a classification code of the lyrics classification of the processing-target section from the third server device 95.

The third server device 95 comprises a classifier 951 configured to output the classification code of the lyrics in response to the input of the lyrics. The classifier 951 is constructed with machine learning using training data. For example, an operator can manually determine the lyrics classification of every single one of samples. The operator can create the training data by associating each sample with the classification code of thus determined lyrics classification. The operator can let a learning device, which is not shown, to learn design parameters of the classifier 951 by machine learning, so that input and output of the classifier 951 correspond to the associations between the lyrics and the classification codes represented by a group of the training data. The classifier 951 can be created in this manner. Various algorithms are known as machine learning algorithms. These well-known machine learning algorithms can be applied to the classifier 951.

Figure 11:
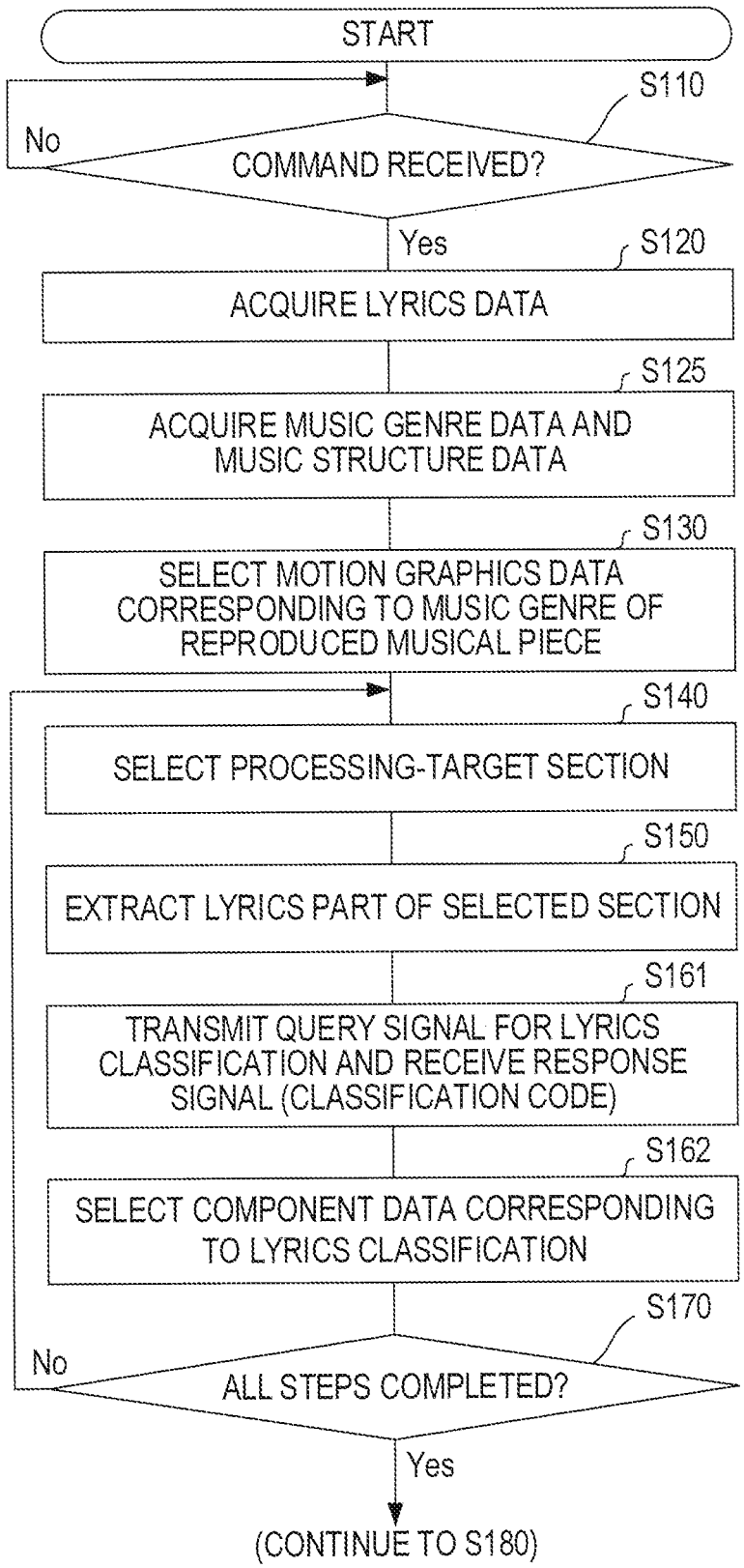
FIG. 11 is a flowchart showing a command receiving process in the third modified example.

The reproduction planning unit 611 is configured to perform the command receiving process shown in FIG. 11 in place of the command receiving process shown in FIG. 6. Similar to the reproduction planning unit 511 in the aforementioned embodiment, the reproduction planning unit 611 performs the processings from S110 to S150 once the command receiving process shown in FIG. 11 is initiated. Subsequently, the reproduction planning unit 611 performs the processings in S161 and S162, which are in place of the processing in S160, and selects the component data D21 to be used in the processing-target section. The reproduction planning unit 611 subsequently performs the processings in and after S170 similarly to the aforementioned embodiment.

In S161, the reproduction planning unit 611 transmits a query signal for the lyrics classification including the lyrics part extracted in S150 to the third server device 95, and as a response signal to the query signal, receives from the third server device 95 a signal including the classification code that the classifier 951 outputted in response to the input of the lyrics classification.

In S162, the reproduction planning unit 611 identifies the component data D21 associated with the classification code D221 with reference to the conditions data D22 of the processing-target section in accordance with the classification code indicated by the response signal received from the third server device 95 and selects the identified component data D21 as the component data D21 to be used in the processing-target section. The reproduction planning unit 611 subsequently performs the processings of and after S170.

In the present modified example, the reproduction planning unit 611 inputs the lyrics part of each section to the classifier 951, which is pre-trained by machine learning, through the third server device 95 and acquires the classification code of the lyrics classification corresponding to the input from the classifier 951 as the output of the classifier 951 corresponding to the input. The reproduction planning unit 611 selects, from two or more sets of the component data D21, the component data D21 defining the motion graphics that fit the meaning of the lyrics of the reproduced musical piece in accordance with the aforementioned acquired classification code D221 and creates the reproduction plan for the motion graphics.

In the present modified example, the lyrics of each section can be classified with high accuracy by using the classifier 951 trained by machine learning. Accordingly, it is possible to construct the music reproduction system 3 that can appropriately display the motion graphics corresponding to the meaning of the lyrics.

Fourth Modified Example

Figure 12:
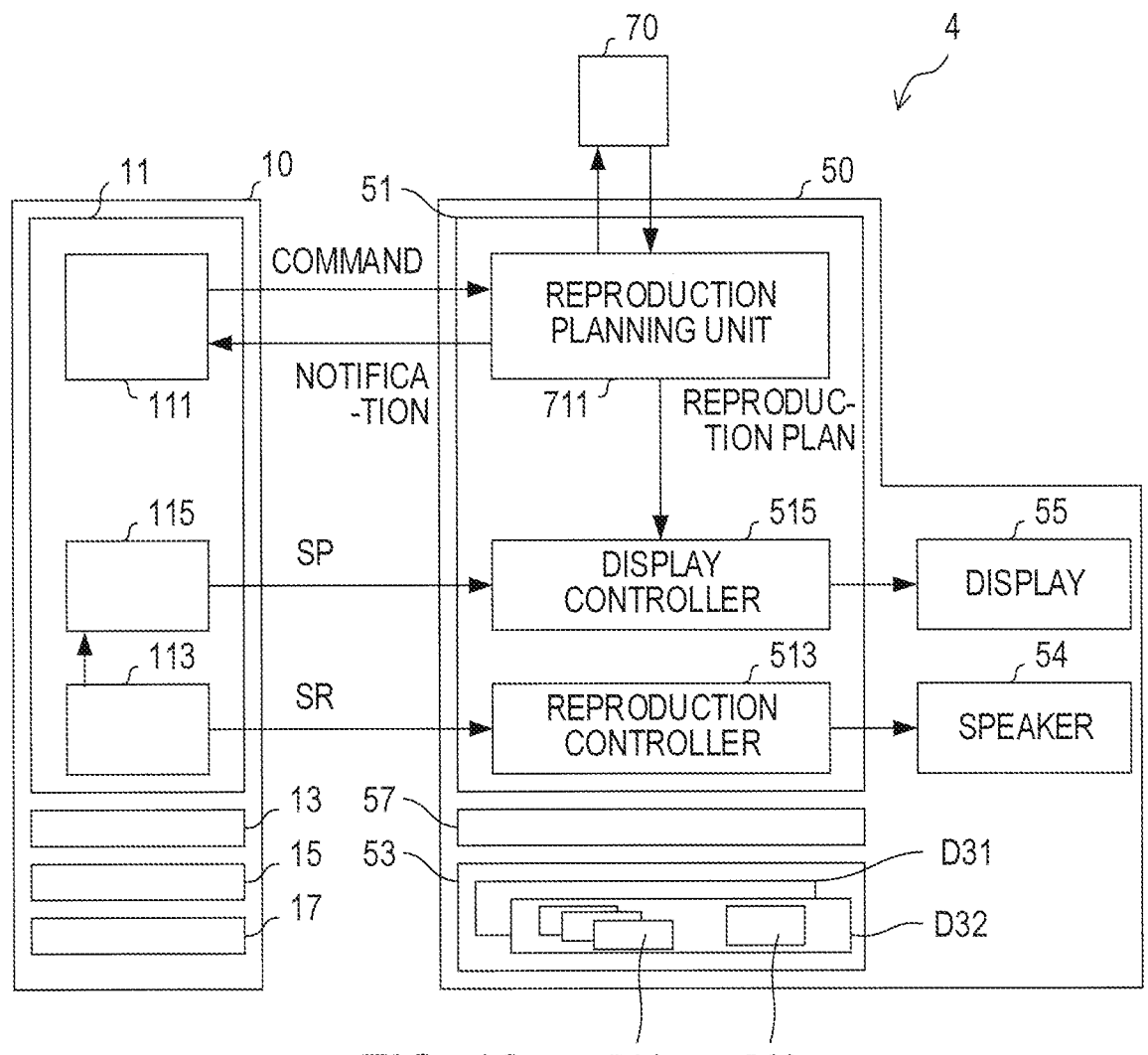
FIG. 12 is a block diagram showing a schematic configuration of a music reproduction system in a fourth modified example.

A music reproduction system 4 of the fourth modified example basically comprises an identical hardware configuration to that of the music reproduction system 1 in the aforementioned embodiment. Nonetheless, as shown in FIG. 12, a reproduction planning unit 711 in this music reproduction system 4, which is included in place of the reproduction planning unit 511 in the aforementioned embodiment, is configured to create the reproduction plan without acquiring the music genre data DG and the music structure data DS from the second server device 90. The reproduction planning unit 711 performs the command receiving process shown in FIG. 13 in place of the command receiving process shown in FIG. 6.

Figure 13:
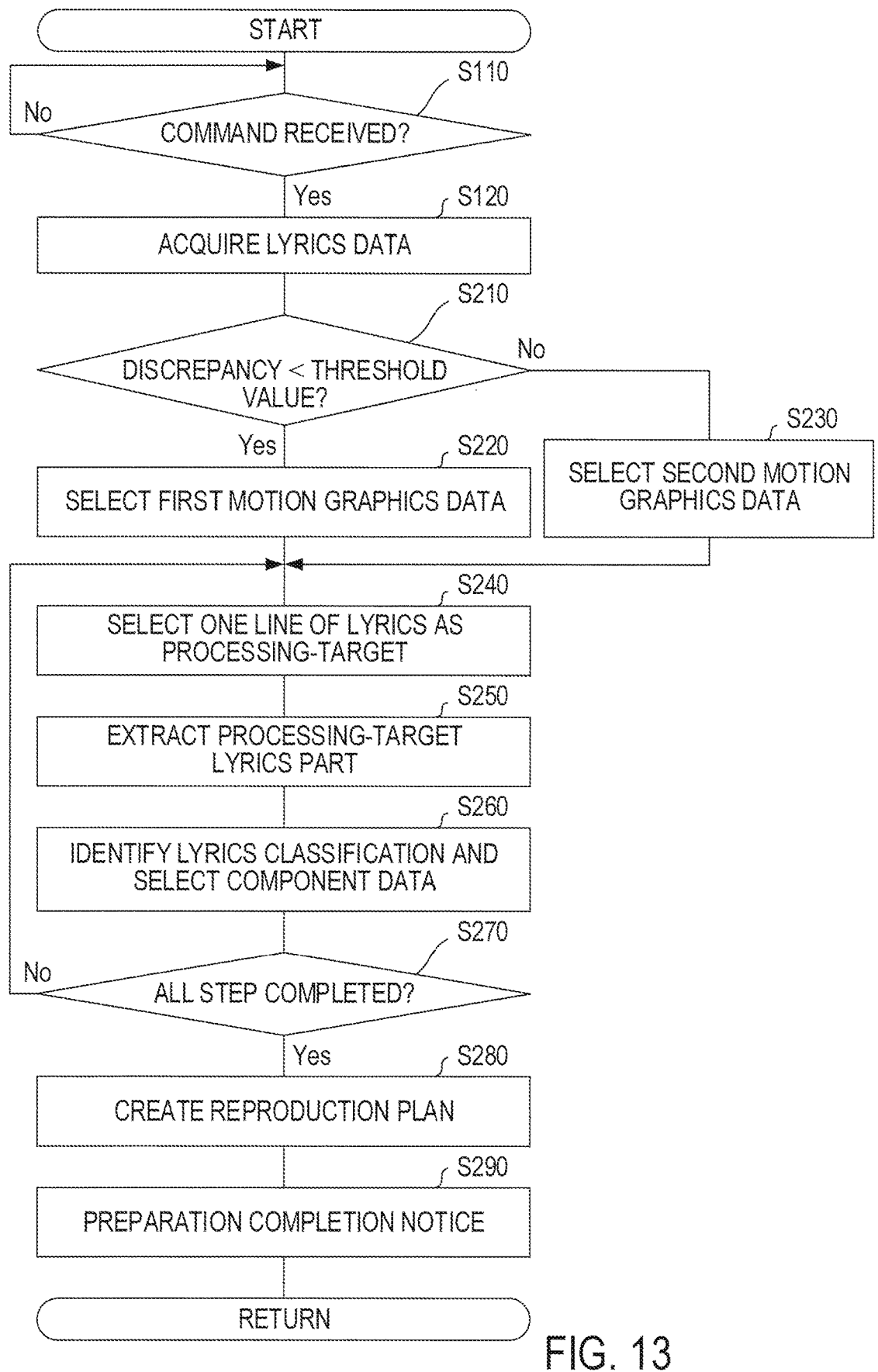
FIG. 13 is a flowchart showing a command receiving process in the fourth modified example.

Once the command receiving process shown in FIG. 13 is initiated, the reproduction planning unit 711 performs the processings in and after S210 after performing the processings of S110 and S120 similarly to the aforementioned embodiment.

In S210, it is determined whether a discrepancy E=|P1−P2|, which is a discrepancy between a reproduction time length P1 of a musical piece in accordance with the musical piece data D1 and a musical piece time length P2 shown in the lyrics data DL is less than a predefined threshold value.

Information of the reproduction time length P1, which is necessary for this determination, can be acquired from the portable communication terminal 10. For example, the portable communication terminal 10 can provide the acoustic reproduction device 50 with information of the reproduction time length P1 by including the information of the reproduction time length P1 identified from the musical piece data D1 in the music information data DF, which is transmitted to the acoustic reproduction device 50. In the present modified example, the lyrics data DL can include the information of the musical piece time length P2.

The reproduction planning unit 711 selects the motion graphics data to be used in creating the reproduction plan from among the motion graphics data D31 and D32 (see FIG. 12) stored in the storage unit 53 in the acoustic reproduction device 50 in response to whether the discrepancy E is less than the threshold value (S220, S230).

In the present modified example, the storage unit 53 of the acoustic reproduction device 50 comprises the first motion graphics data D31 and the second motion graphics data D32 in place of the motion graphics data D2 for each music genre in the aforementioned embodiment. Each of the motion graphics data D31 and D32 comprises two or more sets of the component data D21 and a single set of the conditions data D22. Similarly to the aforementioned embodiment, the conditions data D22 defines the component data D21 that should be used for each lyrics classification.

The first motion graphics data D31 defines the motion graphics that should be displayed in a setting where the discrepancy E is less than the threshold value. The second motion graphics data D32 defines the motion graphics that should be displayed in a setting where the discrepancy E is equal to or greater than the threshold value.

Accordingly, once it is determined that the discrepancy E is less than the threshold value (S210: Yes), the reproduction planning unit 711 proceeds the processing to S220 and selects the first motion graphics data D31 of the motion graphics data D31 and D32 as the reference motion graphics data. Meanwhile, once it is determined that the discrepancy E is equal to or greater than the threshold value (S210: No), the reproduction planning unit 711 proceeds the processing to S230 and selects the second motion graphics data D32 of the motion graphics data D31 and D32 as the reference motion graphics data.

The reproduction planning unit 711 then proceeds the processing to S240, selects the component data D21 to be used for each line of the lyrics with reference to the motion graphics data selected in S220 or S230, and creates the reproduction plan (S240 to S280).

More specifically, the reproduction planning unit 711 selects one line of the lyrics included in the musical piece as a processing-target lyrics part with reference to the lyrics data DL (S240). The reproduction planning unit 711 then extracts the processing-target lyrics part from the lyrics data DL (S250), analyzes the extracted lyrics part, and selects the component data D21 corresponding to the classification to which the lyrics part belongs as the component data D21 to be used in a vocal section in the lyrics part (S260).

The selection of the component data D21 can be done by the same method as in the processing in S160 in the aforementioned embodiment with reference to the single set of the conditions data D22 included in the motion graphics data selected as mentioned above (FIG. 12). Alternatively, the selection of the component data D21 can be done by the same method as in S161 and S162 in the third modified example.

After the processing in S260, the reproduction planning unit 711 determines whether the processings from S250 to S260 have been performed for all the lines included in the lyrics (S270). If it is determined that the aforementioned processings have not been performed for all the lines (S270: No), the reproduction planning unit 711 proceeds the processing to S240, selects an unprocessed line as the processing-target lyrics part, and performs the processings in and after S250.

If it is determined that the aforementioned processings have been performed for all the lines (S270: Yes), the reproduction planning unit 711 proceeds the processing to S280.

In S280, the reproduction planning unit 711 creates the reproduction plan to display on the display 55 the motion graphics of the test image (lyrics) and the background image as selected in S260 at each reproduction position of the musical piece in accordance with the lyrics data DL and the component data D21 selected in S260 for each line of the lyrics.

More specifically, the reproduction planning unit 711 creates the reproduction plan to cause the display controller 515 to control the display 55 in accordance with the reproduction position signal SP, so that the display 55 displays the motion graphics of the text image (lyrics) in accordance with the text motion defining data D211 included in the component data D21 corresponding to the lyrics classification of the line to be performed with vocal, and the motion graphics of the background image in accordance with the background motion defining data D212 included in the same component data D21 when each line of the lyrics is performed with vocal.

The reproduction planning unit 711 can create the reproduction plan in accordance with the component data D21 for the lyrics classification of "no lyrics" included in the reference motion graphics data for a beginning section of the musical piece, which has no lyrics and is from the beginning of the music to the beginning of the vocal, and an ending section of the musical piece, which has no lyrics and is from the end of the vocal to the end of the music so that the display 55 displays the motion graphics unique to these sections.

The reproduction planning unit 711 proceeds the processing to S290 after creating the reproduction plan as above in S280, and transmits the preparation completion notice to the portable communication terminal 10. In response to the preparation completion notice, the reproduction of the musical piece is performed through the reproduction controller 513 and the speaker 54 in accordance with the reproduction signal SR transmitted from the portable communication terminal 10, and the display of the motion graphics corresponding to the progression of the musical piece and to the meaning of the lyrics is performed through the display controller 515 and the display 55 in accordance with the reproduction position signal SP and the aforementioned reproduction plan.

In the present modified example, the motion graphics data D31 and D32 are selectively used as mentioned above in accordance with the size of the discrepancy E between the reproduction time length P1 of the musical piece in accordance with the musical piece data D1 and the musical piece time length P2 shown in the lyrics data DL.

If the lyrics are presented in the motion graphics with intense changes when the discrepancy E is large, a timing discrepancy between the motion graphics and the lyrics actually performed with vocal may be significant to the user. The discrepancy E may be caused by differences between an audio source of the musical piece where the lyrics data DL is expected from and an audio source of the musical piece data D1 to be processed for reproduction.

If the motion graphics data D31 and D32 is created to display a type of motion graphics with more moderate changes in a case where the discrepancy E is equal to or greater than the threshold value than in a case where the discrepancy E is less than the threshold value, then the significance of the time discrepancy felt by the user can be reduced, and appropriate motion graphics that fit the progression of the musical piece can be displayed on the display 55.

Figure 14:
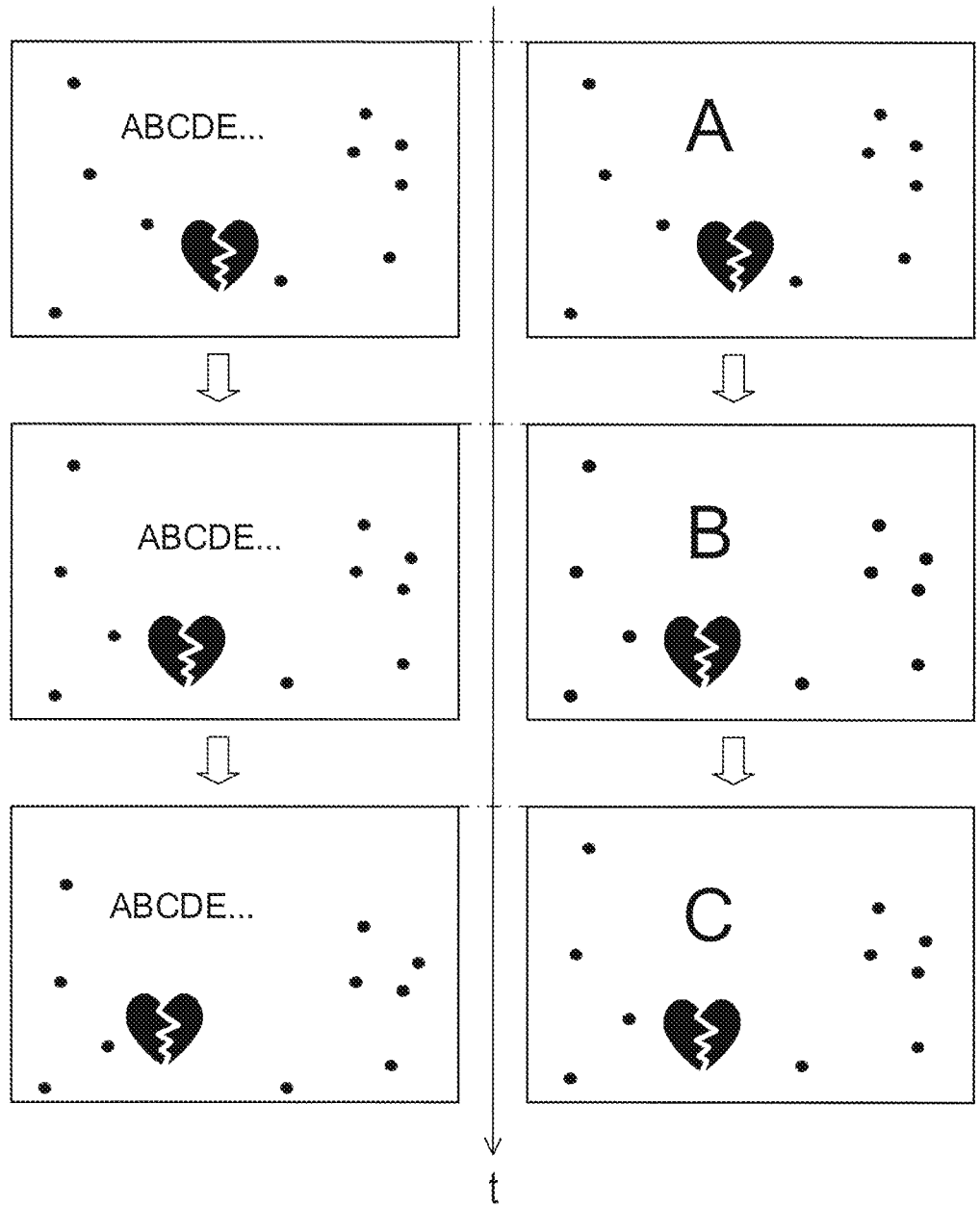
FIG. 14 is a diagram showing an example of motion graphics.

As shown in the left part of FIG. 14, examples of presentation method of a line of the lyrics may include, a method of displaying words constituting the line in temporal order during a period that the line is performed with vocal in addition to a method of displaying the entire line on the display 55 during the period. In the left part of FIG. 14, an embodiment in which the lyrics "ABCDE" are kept displayed along a time axis t is shown. In the right part of FIG. 14, an embodiment in which the words constituting the lyrics "ABCDE" are displayed in temporal order along the same time axis t is shown. With respect to the motion graphics of the text image, the former embodiment is one example of a type of motion graphics with moderate changes, and the latter embodiment is one example of a type of motion graphics with intense changes compared to that of the former embodiment.

In accordance with the aforementioned essence, the creator of the motion graphics data D31 and D32 can create the component data D21 and the conditions data D22 of the motion graphics data D31 and D32 so that the motion graphics defined by the component data D21 of the second motion graphics data D32 are of the kind with more moderate changes than the motion graphics defined by the component data D21 of the first motion graphics data D31 with respect to the component data D21 of the first motion graphics data D31 and the component data D21 of the second motion graphics data D32 associated with the same lyrics classification.

The example embodiments of the present disclosure including the modified examples are explained hereinbefore. Nevertheless, the present disclosure is not limited to the aforementioned embodiments and may be embodied in various modes. For example, the form of displaying the motion graphics is not limited to the aforementioned examples. Sole motion graphics data D2 may be provided in common for all music genre. The motion graphics in accordance with the meaning of the lyrics may be changed for each section, for each line of the lyrics, or for each of segments of the lyrics defined by further dividing the entire lyrics of the musical piece.

Functions of the acoustic reproduction device 50 may be entirely or partially incorporated into the portable communication terminal 10. More specifically, the portable communication terminal 10 may be configured to store the motion graphics data D2 into the storage unit 13. The control unit 11 of the portable communication terminal 10 may be configured to acquire the lyrics data DL, the music genre data DG, and the music structure data DS corresponding to the musical piece data D1, which is the subject of the reproduction processing, from the server devices 70 and 90 through the communication unit 17. The control unit 11 can display the motion graphics on a display disposed in the user interface 15 in harmony with the progression of the musical piece in accordance with the data acquired from the server devices 70 and 90 when the musical piece is reproduced in accordance with the musical piece data D1. The reproduced sound in accordance with the musical piece data D1 can be outputted from a speaker (not shown) of the portable communication terminal 10.

In a case where all of the functions of the acoustic reproduction device 50 are substantially incorporated into the portable communication terminal 10, the acoustic reproduction device 50 is not required in the music reproduction system 1. More specifically, the music reproduction system 1, 3, 4 may each comprise a single device integrating the functions of the portable communication terminal 10 and the acoustic reproduction device 50 in place of the portable communication terminal 10 and the acoustic reproduction device 50. The functions of the portable communication terminal 10 and the acoustic reproduction device 50 may be realized by a system comprising one or more processors and one or more memories.

The portable communication terminal 10 may be configured to utilize the acoustic reproduction device 50 simply as the speaker 54 and the display 55. More specifically, the portable communication terminal 10 may be configured to transmit a reproduction signal in accordance with the musical piece data D1 and a visual signal representing the motion graphics synchronized with the reproduction signal, or a signal integrating the reproduction signal and the visual signal to the acoustic reproduction device 50 as a stream signal. In this case, the acoustic reproduction device 50 can operate to reproduce the musical piece from the speaker 54 in accordance with the signal received from the portable communication terminal 10 and display the motion graphics on the display 55. The portable communication terminal 10 may be replaced with other non-portable electric device such as a desktop computer.

The technique in the present disclosure may be applied for displaying motion graphics corresponding to a reproduced sound other than of musical pieces. Motion graphics that fit the meaning of the verbal expression corresponding to the reproduced sound may be selected from among the various types of motion graphics; the selected motion graphics may be used to display the verbal expression corresponding to the reproduced sound. For example, motion graphics corresponding to the weather may be displayed on the display 55 when a sound for announcing the weather is outputted from the speaker 54.

Furthermore, functions of one element in the aforementioned embodiments may be divided into two or more elements. Functions of two or more elements may be integrated into one element. A part of the configurations of the aforementioned embodiments may be omitted. At least a part of the configurations of the aforementioned embodiments may be added to or replaced with other configurations of another one of the aforementioned embodiments. It should be noted that any and all modes that are encompassed in the technical ideas identified by the languages in the claims are embodiments of the present disclosure.

The correspondence relationship between the terms in the present disclosure is as follows. The speaker 54 corresponds to one example of the acoustic device; the display 55 corresponds to one example of the display device. The processings in S120 and S125 that the reproduction planning units 511, 611, and 711 perform correspond to one example of the processings that the acquirer performs. The processings in S130 to S190 and S210 to S290 that the reproduction planning unit 511, 611, 711 perform and the display control of the display 55 in accordance with the reproduction plan that the display controller 515 performs correspond to one example of the processings that the display controller performs.

The invention claimed is:

1. A display control method comprising:
   acquiring lyrics data of a musical piece reproduced by an acoustic device; and
   displaying, on a display device, motion graphics corresponding to the musical piece reproduced by the acoustic device in accordance with the lyrics data, the musical piece being reproduced by the acoustic device based on musical piece data of the musical piece, the musical piece data including information of a reproduction length of the musical piece,
   wherein the displaying the motion graphics on the display device includes:
      determining a discrepancy between a reproduction length of the musical piece identified based on the lyrics data and a reproduction length of the musical piece determined from the information included in the musical piece data used for reproducing the musical piece;
      selecting a type of motion graphics that fits a meaning of lyrics of the reproduced musical piece from among various types of motion graphics so that a type of motion graphics having fewer changes with respect to a time period is selected when the discrepancy is greater than a threshold compared to when the discrepancy is less than the threshold; and
      displaying the selected type of motion graphics on the display device in harmony with progression of the musical piece reproduced by the acoustic device, the selected type of motion graphics including the lyrics of the musical piece in a form of a text.

2. The display control method according to claim 1, wherein the various types of motion graphics each include ornamental motion graphics configured to ornament the lyrics, and
   wherein the selecting includes selecting the ornamental motion graphics that fit the meaning of the lyrics.

3. The display control method according to claim 1, wherein the various types of motion graphics each correspond to one or more words, and
   wherein the selecting includes selecting a type of motion graphics that corresponds to a word included in the lyrics of the musical piece from among the various types of motion graphics.

4. The display control method according to claim 1, wherein the selecting includes:
   inputting at least a portion of the lyrics of the musical piece to a classifier which is pre-trained by machine learning;
   acquiring, from the classifier, classification information of the meaning of the lyrics corresponding to the inputting as an output of the classifier; and
   selecting a type of motion graphics that fits the meaning of the lyrics of the reproduced musical piece from among the various types of motion graphics in accordance with the acquired classification information.

5. The display control method according to claim 1, wherein the selecting includes selecting, for each of sections defined by dividing an entirety of lyrics of the musical piece, a type of motion graphics that fits the meaning of the lyrics in each section from among the various types of motion graphics.

6. The display control method according to claim 1, wherein the selecting includes selecting a type of motion graphics that fits a language of the lyrics of the reproduced musical piece from among the various types of motion graphics.

7. The display control method according to claim 1, wherein the selecting includes selecting a type of motion graphics that fits a time of release of the reproduced musical piece from among the various types of motion graphics.

8. A display control system comprising:
   a processor;
   a memory;
   a display device;
   an acoustic device; and
   a communicator for communication with a server,
   wherein the memory stores instructions which, when executed by the processor, cause the processor to perform processing steps that include:
      acquiring lyrics data of a musical piece reproduced by the acoustic device from the server; and
      displaying, on the display device, motion graphics corresponding to the musical piece reproduced by the acoustic device in accordance with the lyrics data, the musical piece being reproduced by the acoustic device based on musical piece data of the musical piece, the musical piece data including information of a reproduction length of the musical piece,
   wherein the displaying the motion graphics on the display device includes:
      determining a discrepancy between a reproduction length of the musical piece identified based on the lyrics data and a reproduction length of the musical piece determined from the information included in the musical piece data used for reproducing the musical piece;
      selecting a type of motion graphics that fits a meaning of lyrics of the reproduced musical piece from among various types of motion graphics so that a type of motion graphics having fewer changes with respect to a time period is selected when the discrepancy is greater than a threshold compared to when the discrepancy is less than the threshold; and
      displaying the selected type of motion graphics on the display device in harmony with progression of the musical piece reproduced by the acoustic device, the selected type of motion graphics including the lyrics of the musical piece in a form of a text.

9. The display control system according to claim 8,
wherein the various types of motion graphics each include ornamental motion graphics configured to ornament the lyrics, and
wherein the selecting includes selecting the ornamental motion graphics that fit the meaning of the lyrics.

10. The display control system according to claim 8,
wherein the various types of motion graphics each correspond to one or more words, and
wherein the selecting includes selecting a type of motion graphics that corresponds to a word included in the lyrics of the musical piece from among the various types of motion graphics.

11. The display control system according to claim 8, wherein the selecting includes:
inputting at least a portion of the lyrics of the musical piece to a classifier which is pre-trained by machine learning;
acquiring from the classifier classification information of the meaning of the lyrics corresponding to the inputting as an output of the classifier; and
selecting a type of motion graphics that fits the meaning of the lyrics of the reproduced musical piece from among the various types of motion graphics in accordance with the acquired classification information.

12. The display control system according to claim 8, wherein the selecting includes selecting, for each of sections defined by dividing an entirety of lyrics of the musical piece, a type of motion graphics that fits the meaning of the lyrics in each section from among the various types of motion graphics.

13. The display control system according to claim 8, wherein the selecting includes selecting a type of motion graphics that fits a language of the lyrics of the reproduced musical piece from among the various types of motion graphics.

14. The display control system according to claim 8, wherein the selecting includes selecting a type of motion graphics that fits a time of release of the reproduced musical piece from among the various types of motion graphics.

15. A display control method comprising:
acquiring lyrics data of a musical piece reproduced by an acoustic device; and
displaying, on a display device, motion graphics corresponding to the musical piece reproduced by the acoustic device in accordance with the lyrics data, the musical piece being reproduced by the acoustic device based on musical piece data of the musical piece, the musical piece data including information of a reproduction length of the musical piece,
wherein the displaying the motion graphics on the display device includes:
determining a discrepancy between a reproduction length of the musical piece identified based on the lyrics data and a reproduction length of the musical piece determined from the information included in the musical piece data used for reproducing the musical piece;
selecting a type of motion graphics from among various types of motion graphics based on the discrepancy so that a type of motion graphics that display fewer words in the lyrics over a time period is selected when the discrepancy is less than a threshold; and
displaying the selected type of motion graphics on the display device in harmony with progression of the musical piece reproduced by the acoustic device.

16. The display control method according to claim 15,
wherein the various types of motion graphics each include ornamental motion graphics configured to ornament the lyrics, and
wherein the selecting includes selecting the ornamental motion graphics that fit the meaning of the lyrics.

17. The display control method according to claim 15,
wherein at least two or more types of motion graphics of the various types of motion graphics each correspond to one or more words, and
wherein the selecting includes selecting a type of motion graphics that corresponds to a word included in the lyrics of the musical piece from among the at least two or more types of motion graphics.

18. The display control method according to claim 15, wherein the selecting includes:
inputting at least a portion of the lyrics of the musical piece to a classifier which is pre-trained by machine learning;
acquiring from the classifier classification information of the meaning of the lyrics corresponding to the inputting as an output of the classifier; and
selecting a type of motion graphics that fits the meaning of the lyrics of the reproduced musical piece from among the various types of motion graphics in accordance with the acquired classification information.

19. The display control method according to claim 15, wherein the selecting includes selecting, for each of sections defined by dividing an entirety of lyrics of the musical piece, a type of motion graphics that fits the meaning of the lyrics in each section from among the various types of motion graphics.

20. The display control method according to claim 15, wherein the selecting includes selecting a type of motion graphics that fits at least one of a language of the lyrics and a time of release of the reproduced musical piece from among the various types of motion graphics.

* * * * *